United States Patent [19]

Toepel

[11] Patent Number: 5,245,624
[45] Date of Patent: Sep. 14, 1993

[54] LASE AND LASER PUMP LAMP CHAMBER

[76] Inventor: Michael P. Toepel, P.O. Box 343, Pittsfield, N.H. 03263

[21] Appl. No.: 791,332

[22] Filed: Nov. 14, 1991

[51] Int. Cl.$^5$ ............................................... H01S 3/093
[52] U.S. Cl. ......................................... 372/72; 372/69
[58] Field of Search ............................. 372/72, 92, 69

[56] References Cited

U.S. PATENT DOCUMENTS

| 3,528,030 | 9/1970 | Bickel et al. | 372/72 |
| 3,582,816 | 6/1971 | Waszak et al. | 372/72 |
| 3,599,113 | 8/1971 | Cremosnik | 372/72 |
| 3,611,189 | 10/1971 | Stone | 372/72 |
| 3,721,917 | 3/1973 | Sereda et al. | 372/72 |
| 4,005,333 | 1/1977 | Nichols | 372/72 |
| 4,010,397 | 3/1977 | Hon | 372/72 |
| 4,496,873 | 1/1985 | Bédu et al. | 372/72 |
| 4,858,243 | 8/1989 | Bar-Joseph | 372/72 |

Primary Examiner—Léon Scott, Jr.
Attorney, Agent, or Firm—Stephen G. Matzuk

[57] ABSTRACT

An elongated cylindrical pump lamp which coaxially surrounds a lasing material and provides high energy excitation thereof uniformly around and along the length of the lasing material. The pump lamp chamber has a length to diameter ratio of approximately one to one to four to one wherein the low pressure contents (such as xenon) is excited by an electric field and produces a uniform flash discharge along the length of the pump lamp and radially about the lasing material to efficiently excite the lasing material. Optical pumping efficiency is increased with integral mirror surfaces and circuitous internal cavities providing elongated internal discharge paths. Alternate embodiments include a laser pump lamp wherein the outer surface of the lasing material forms the interior wall of the pump lamp chamber.

18 Claims, 2 Drawing Sheets

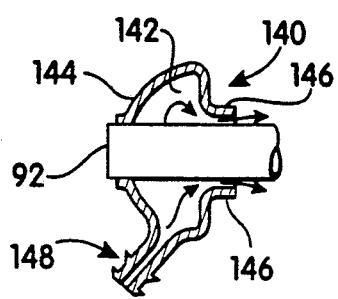 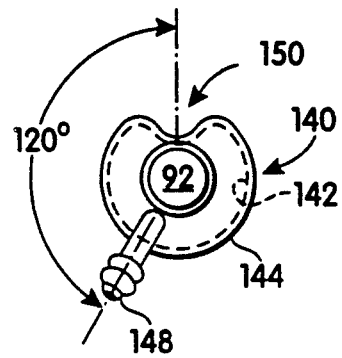
Fig. 4A  Fig. 4B
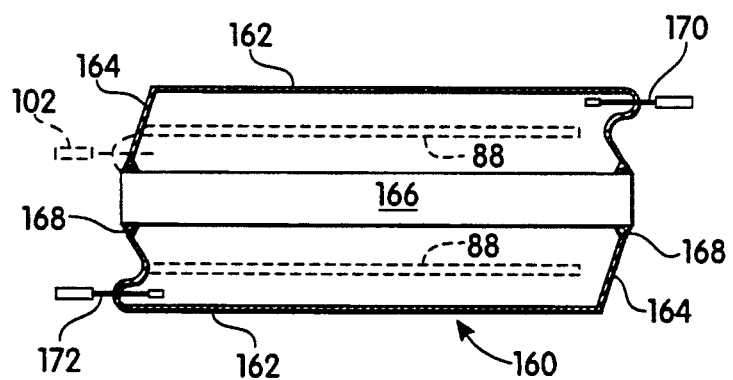
Fig. 5

LASE AND LASER PUMP LAMP CHAMBER

FIELD OF THE INVENTION

The present invention relates to lasing material exciting devices, in particular to elongated cylindrical pump lamps having a cavity and associated cooling manifolds therein to receive the lasing material and lasers accordingly constructed.

BACKGROUND OF THE INVENTION

The efficient excitation of elongated lasing (Nd:YAG, Nd:Glass, etc.) material by pump lamps has heretofore most efficiently been provided by spirally wrapping a tubular pump lamp about the length of the laser material or disposing the tubular pump lamp alongside the laser material and providing secondary focusing and/or diffusing material to efficiently couple the pump lamp generated excitation to the laser material. In all such applications, the pump lamp comprises a tubular housing of a typical length to width ratio of at least ten.

Narrow elongated pump lamps having a longitudinally disposed cavity to coaxially receive the lasing material have been described. Such coaxial pump lamps are relatively long compared to their width, and when correctly electrically excited, have relatively low pumping efficiency as the gaseous discharge material therein is likely to become ionized along a single, fibre-like path, emitting useful radiation over only a portion of the region surrounding the lasing material.

Alternative coaxial pump lamps have been described which are excited by RF induction methods, wherein the necessities of properly impedance matching the excitation field with the gas in the lamp generally results in a similarly elongated, shallow laser pump lamp.

SUMMARY OF THE INVENTION

The pump lamp according to one embodiment of the present invention provides a chamber having an enlarged diameter providing a relatively low length to width ratio, typically less than four to one, wherein the excitable gas material contained within the interior is excited by two radially opposing electrodes. The resulting structure provides efficient and uniform pumping of a coaxially retained laser material and makes possible the construction of a laser having significantly limited lengths.

BRIEF DESCRIPTION OF THE DRAWING

These and other features of the present invention will be better understood by reading the following detailed description, taken together with the drawing, wherein:

FIG. 4A and FIG. 4B are cross-section and end views of a laser rod retainer and coolant connector receivable by the pump lamp embodiments shown; and FIG. 5 is a cross-section of a further embodiment of the present invention.

DETAILED DESCRIPTION OF THE PRESENT INVENTION

Figure 1A:
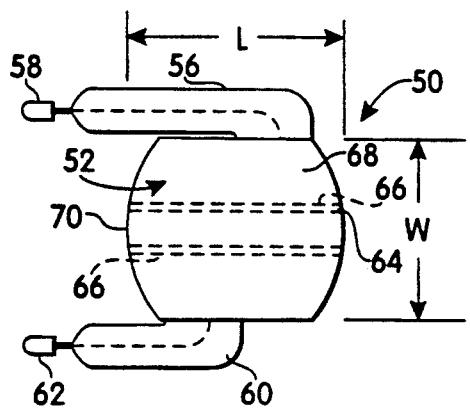
FIG. 1A is a longitudinal plan view, partially in cross section of one embodiment of the present invention.
Figure 1B:
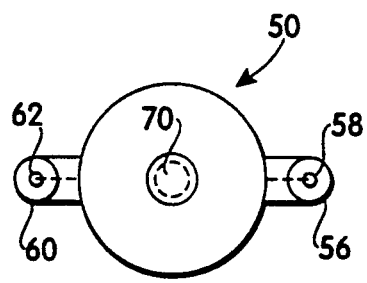
FIG. 1B is a vertical plane view of the embodiment of the FIG. 1A.

A longitudinal cross section and an end view of one embodiment of the present invention is shown in FIGS. 1A and 1B, wherein the length L and width W of the lamp chamber 52 is approximately 1 inch in length and 1.0 inches in total width. Of the width dimension, approximately ¼ inch for each on opposing surfaces of the pump lamp chamber is provided for the glass side arms 56, 60 wherein the electrodes 58 and 62 communicate with the gas contained within the interiors of volume 62 of the pump lamp housing 52. According to the embodiment of FIGS. 1A and 1B, the laser material 70 is longitudinally contained within the aperture 64 of the pump lamp housing 52 as defined by interior wall 66.

The pump lamp chamber of FIG. 1A may be elongated preferably to a maximum of 4 inches, and lamp discharge characteristics maintained provided the internally measured chamber inside and outside diameters range from values which ar greater than or equal to 3 mm and 14 mm respectively, to inside and outside diameters greater than or equal to 8.3 mm and 19.1 mm respectively, when Xenon gas is used, maintaining an i.d.-o.d. difference of at least 5.4 mm. Similarly, the preferred minimum diameter of the lasing material is 0.25 inches.

Alternate embodiments include the introduction of cerium doped quartz, diffused surface or other material between the interior wall 66 and the lasing material 70 which exhibits specific light filtering, collecting or diffusing characteristics. The interior wall, filter material and/or lasing material may be integrally combined and may further include regions therebetween to allow coolant fluid to pass, as described below.

Further alternative embodiments of the structure of FIGS. 1A and 1B include the alternative disposition of the side arms 56 and 60, such as extending radially outward from the housing 52 without bend thereof.

Figure 2A:
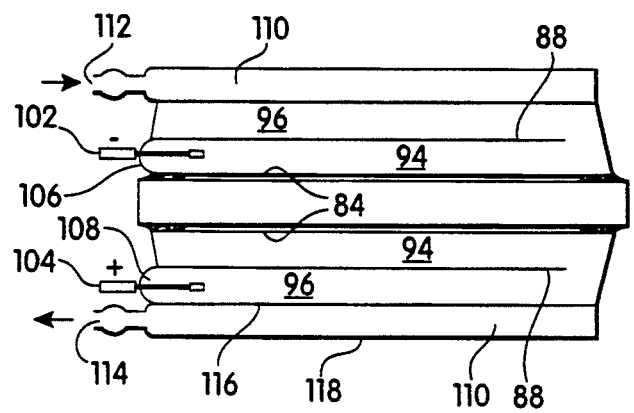
FIG. 2A is a cross section of a second embodiment of the present invention.
Figure 2B:
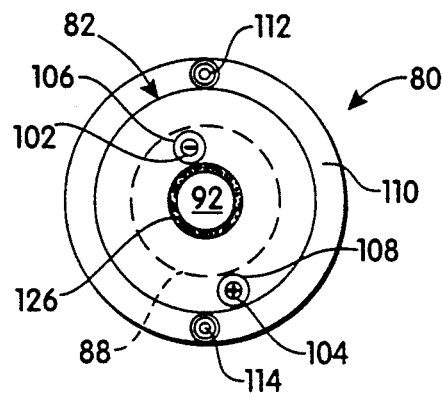
FIG. 2B is an end view of the embodiment shown in FIG. 2A.

A longitudinal cross section and end view of alternative embodiment of the present invention is shown in FIGS. 2A and 2B. The pump lamp chamber 82 extends longitudinally over the lasing material 92 and includes an interior wall 84 and exterior wall 86 and a longitudinally disposed optically transparent baffle 88 which substantially bifurcates the interior of the housing 82 into an inner 94 and outer 96 concentrically disposed region which communicates at one end of the interior portion of the housing 82, forming a convoluted conduction path of approximately twice the length L of the housing 82. Thus the pump lamp electrical impedance is doubled for a given (short) pump lamp length, resulting in an increased pump lamp life. One end of the convoluted conduction path is connected to an electrode 102 and the other end of the convoluted path is connected to a second electrode 104 which extends through a glass nipple 106 and 108 respectively into the regions 94 and 96, respectively of the convoluted path.

Alternate embodiments of the present invention include an integral coolant housing 110 disposed coaxially about the exterior wall 86 of the pump lamp housing 82. The coolant housing 110 includes a coolant envelope having an inlet 112 and outlet 114 for the coolant fluid to pass. Furthermore, the interior wall 116 or the exterior wall 118 of the coolant housing 110 may also include an optically reflecting material disposed thereon to provide for the reflection of the energy provided by the pump lamp to be reflected into the lasing material 92.

Figure 3:
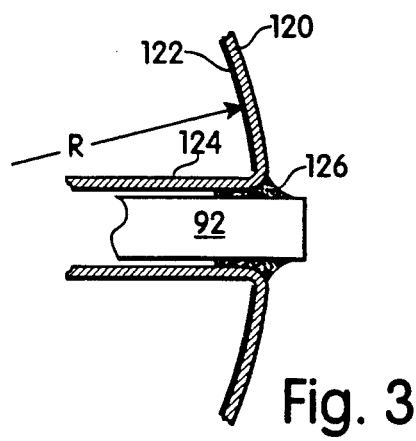
FIG. 3 is a cross section of a portion of one embodiment of the present invention showing details of the pump lamp chamber and the end of the lasing material.

Further details of the embodiments of the present invention are shown in FIG. 3 wherein the end walls 120 of either embodiments of FIGS. 1A and 1B or of FIGS. 2A and 2B are provided with a slight radius R (less than 2L) and internal reflective coating 122 to more efficiently couple the radiant energy to the lasing material 92. Moreover, the interior wall 124 of the laser pump lamp housing is spaced apart slightly from the exterior dimension of the lasing material 92 wherein a glue material 126 may be applied therein at either end of the housing and laser material. Typically, the sealing material 126 comprises a resilient sealant such as a silicon rubber compound such as RTV(TM General Electric). Embodiments of the present invention may also provide a pump lamp housing having one or both end walls comprising planar or substantially planar end walls.

Alternately, the lasing material may be retained within the housings disclosed, and provide for the passage of a coolant fluid (e.g. water, air, etc.) between the lasing material and the pump lamp by rod retainers and coolant connectors 140, shown in FIG. 4A and FIG. 4B. A cavity 142 is formed within the retainer and connector housing 144 which includes a shoulder 146 or other element to mate with the pump lamp end to permit a coolant fluid to enter pump lamp/lasing material space 126 as provided into the cavity 142 via a nipple 148. A radial recess 150 permits access to axially mounted electrodes (102).

A further embodiment of the present invention is shown in FIG. 5, wherein the pump lamp comprises only an external member 162 with electrodes 170, and 172 and end members 164, wherein the coaxially disposed lasing material 166 is sealed directly ( e.g. via metalization, glass frit etc.) or with a sealant 168 (e.g. epoxy, kovar etc.) to apertures in the end members and forms the interior wall of the pump lamp chamber. The external member 162 may receive an external sleeve reflector or reflector coupling, or a reflective coating applied directly to the external surface (not shown). The resulting laser 160 receives the optical pumping energy without attenuation from interposed glass walls, resulting in higher pumping efficiency. Moreover, this embodiment may be adapted to include the baffle 88 and end member disposed electrodes 102, 104, and/or external cooling (not shown in FIG. 5) as described above.

The preferred embodiment of the present invention includes a solid lasing material which may be substituted by a fluid (e.g. liquid or gas) in a suitable container. Further modifications and substitution made by those of ordinary skill in the art are to be considered to be within the scope of the present invention which is not to be limited, except by the claims which follow.

I claim:

1. A laser excitation lamp, comprising:
 a cylindrical bulb having an aperture therethrough forming an annular envelope of outer width W, extending longitudinally along an axis of said cylindrical bulb of length L, said cylindrical bulb having a coaxially disposed cylindrical inner member and an outer member each substantially of length L, wherein
 the ratio of L to W of said outer bulb is less than 2;
 wherein a flashlamp fluid is disposed between said inner and outer members and
 energization electrodes disposed within said cylindrical bulb to provide an electric gradient over a flashlamp fluid path extending over a major portion of the length of said cylindrical bulb, wherein excitation efficiency of said flashlamp is improved.

2. The lamp of claim 1, wherein:
 said energization electrodes extend outwardly from the outer surface of said cylindrical bulb.

3. The lamp of claim 2, wherein
 said energization electrodes are laterally displaced along said axis.

4. The lamp of claim 1, wherein said cylindrical bulb includes confronting convex end pieces having a radius of curvature, wherein the minimal spacing between said end pieces occurs at radially outward area of said end pieces relative to said axis.

5. The lamp of claim 1 wherein said cylindrical bulb inner member comprises an inner wall forming said aperture, for receiving a longitudinally disposed laser material therein.

6. The lamp of claim 5, wherein said laser material is radially dimensioned less than said cylindrical bulb aperture forming a longitudinally extending space between said laser material and said inner wall.

7. The lamp of claim 5, wherein at least one of said confronting end pieces and said outer member of said cylindrical bulb has energy reflective material disposed thereon.

8. A laser assembly comprising:
 a cylindrical bulb having an aperture therethrough forming an annular envelope of outer width W and extending along an axis of said cylindrical bulb of length L, wherein
 the ratio of L to W is less than 2;
 a flashlamp fluid disposed within said cylindrical bulb;
 energization electrodes disposed within said cylindrical bulb to provide an electric gradient over a path extending over a major portion of the length of said cylindrical bulb to excite said flash lamp fluid to pump a laser material;
 wherein said laser material is disposed within said aperture and extends longitudinally for substantially the entire length of said cylindrical bulb wherein said flash lamp fluid substantially surrounds said laser material.

9. The laser assembly of claim 8, wherein said laser material is radially dimensioned less than said cylindrical bulb aperture forming a longitudinally extending space between said laser material and said inner wall.

10. The laser assembly of claim 9, further including fluid coolant disposed between said laser material and said inner wall.

11. The laser assembly of claim 8, wherein the cylindrical bulb further includes
 two radially extending confronting end pieces forming the longitudinal ends of said cylindrical bulb; and
 a cylindrical divider disposed within said cylindrical bulb and extending axially within said cylindrical bulb for a portion of the length of said cylindrical bulb, forming a plurality of connected radially disposed longitudinal chambers within said cylindrical bulb, wherein
 said energization electrodes are disposed at an end of different said radially disposed longitudinal chambers.

12. The laser assembly of claim 8, further comprising a tubular cooling chamber having an input and an output and receiving a coolant fluid therethrough, said tubular coolant chamber being coaxially disposed about said cylindrical bulb.

13. The laser assembly of claim 12, wherein said tubular cooling chamber includes an energy reflective material disposed thereon forming an energy reflector for directing radiant energy from said cylindrical bulb toward said laser material.

14. The laser assembly of claim 8, further including means for retaining said laser material and for providing a fluid passage into said aperture between said laser material and said cylindrical bulb.

15. A laser excitation lamp, comprising:
a cylindrical bulb having an aperture therethrough forming an annular envelope of width W and extending along an axis of length L, wherein
the width W of said bulb is not less than 1 inch; and
energization electrodes disposed within said cylindrical bulb to provide an electric gradient over a path extending over a major portion of the length of said cylindrical bulb to improve excitation efficiency of said lamp.

16. An assembly used in a laser, comprising:
a cylindrical pump lamp including an outer cylindrical member and end members on the ends thereof, each end member including an aperture therein; and an elongated lasing element disposed longitudinally within said pump lamp and along the length of said pump lamps said lasing element having a gas-tight seal with said end member apertures.

17. The assembly of claim 16, wherein said gas-tight seal is one of a kovar and an epoxy seal.

18. The assembly of claim 16, wherein said gas-tight seal includes one of a glass frit and a metalized glass sealing material.

* * * * *